Jan. 22, 1946. G. W. COOK 2,393,458
FLUID ACTUATED COLLET CHUCK
Filed Aug. 22, 1944 2 Sheets-Sheet 1

Inventor
George W. Cook
Batchelor & Scantlebury
Atty.

Patented Jan. 22, 1946

2,393,458

UNITED STATES PATENT OFFICE 2,393,458

FLUID ACTUATED COLLET CHUCK

George W. Cook, Los Angeles, Calif.

Application August 22, 1944, Serial No. 550,565

3 Claims. (Cl. 279—4)

This invention relates to the art of chucks and similar devices adapted to hold and to operate collets. Such devices are particularly useful in the course of various types of machining operations where a succession of duplicate articles is to be operated on, and where speed and ease of chuck operation to receive and hold, and then to release an article, are desirable. It is a general objective of the present invention to provide a collet operating chuck which is capable of a wide variety of uses, and simple and dependable in structure and operation, and capable of fast operation to grip and hold the article and subsequently to release it for removal.

The device of my invention is capable of a wide variety of uses, as will be understood by those skilled in the art. For the purpose of the following description of a preferred and illustrative form of the invention, it will be assumed that the chuck is used on a drill press, for such operations as those which a drill press is capable of performing. Such use however, is not a limitation upon the invention.

Figure 1:
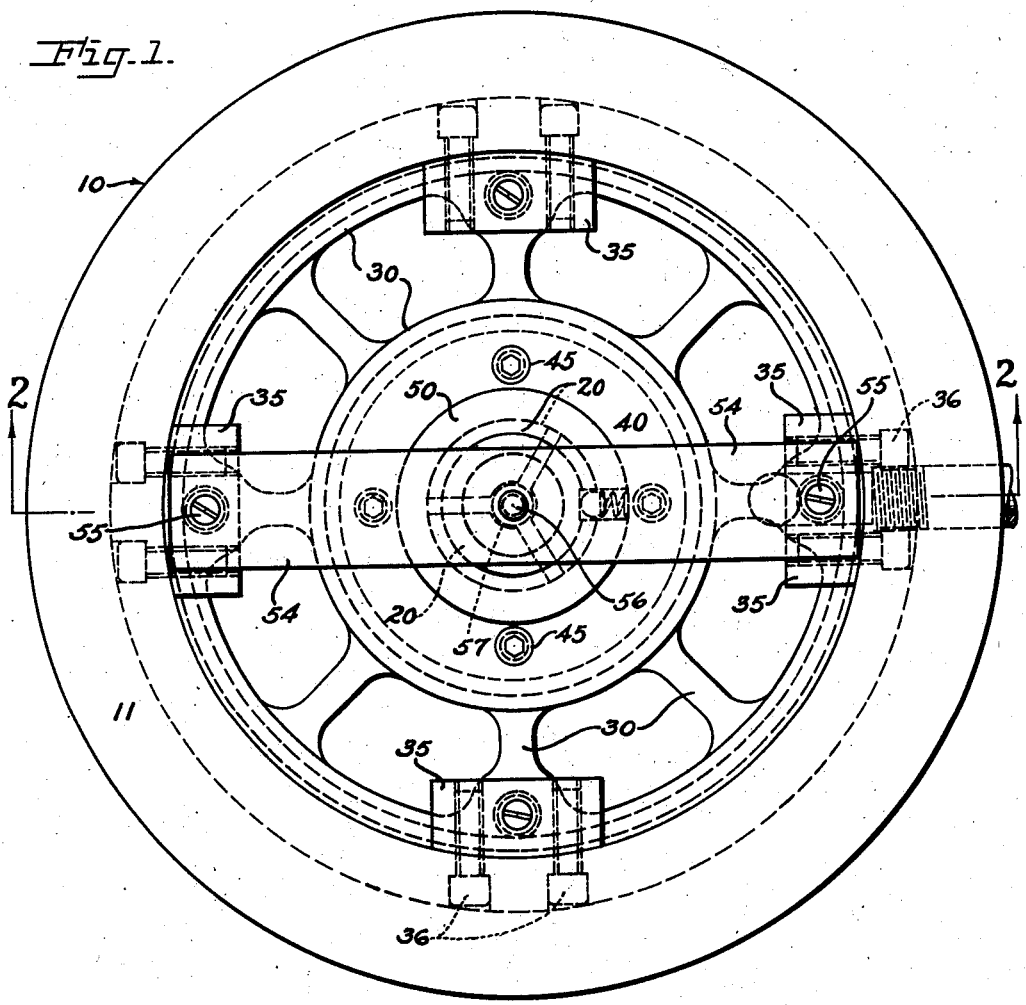
Figure 2:
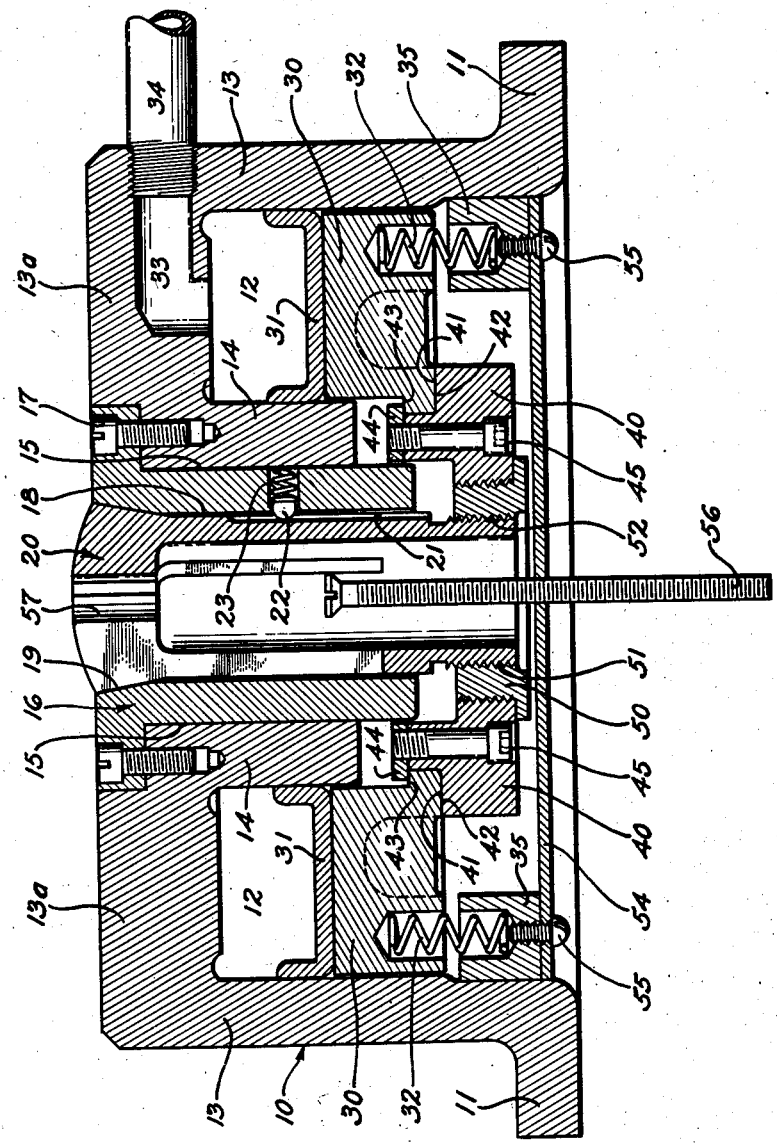

Further and more particular objects of the invention, and its corresponding features and accomplishments, will be best understood from the following detailed description of the present preferred and illustrative form of the invention, reference being had to the accompanying drawings, in which Fig. 1 is a bottom plan of the illustrative chuck, and Fig. 2 is a section taken on line 2—2 of Fig. 1.

As shown in the drawings the chuck has a main housing member 10 provided with a seating flange 11 at its lower edge adapted to rest upon, or be clamped or bolted to the table of a drill press, or to the face plate, table or base of any other machine tool where the chuck may be used. As used on a drill press, the chuck may ordinarily be clamped in position on the table.

Housing 10 contains an annular cylinder 12 which is formed between outer circular wall 13 of the housing and an inner depending cylindric sleeve 14. A head wall 13a closes the upper end of the annular cylinder, the lower end of which is open. This head wall is made fairly thick, as illustrated, allowing holes to be drilled and tapped into it for mounting drill or work jigs on top of the chuck body. The interior bore 15 of sleeve 14 is adapted to snugly take collet adapters of a common external size and of various internal sizes to suit the external dimensions of different sets of collets. A typical adapter is shown at 16, secured in place by cap screws 17. The interior bore 18 of the adapter has the usual and standard conical collet seat 19 at its upper end. The collet, illustrated at 20 is a standard collet.

The adapter 16 may be considered as a part of the sleeve 14, its only functions being to provide a collet seating 19 of a metal more suitable for that purpose than the metal of the main housing will ordinarily be, and to facilitate adaptation to collets of different external sizes. Aside from those provisions the whole device functions as if adapter 16 were unitary with sleeve 14, and thus the sleeve 14 can be said to have or contain the collet receiving bore 18, 19.

Preferably some keying means is employed either to prevent or, preferably, to yieldingly resist, relative rotation of the collet in the adapter. The standard collet has a longitudinal keyway 21, usually engaged by a solid pin or key in the adapter. Such a solid pin or key may be used in my chuck, but I prefer for reasons which will appear to utilize a spring pressed ball 22, pressed inwardly by a spring 23 into yielding engagement with keyway 21 so that the collet will ordinarily be held from rotation in the adapter, but may be rotated therein by the application of sufficient force.

An annular piston 30, with an annular cup leather or rubber 31, operates in annular cylinder 12, supported on a series of springs 32 which raise the piston in the cylinder. The piston is lowered by air or other fluid pressure introduced to the cylinder by way of port 33 and piping 34 which will be controlled by any suitable type of valve capable of alternately admitting and exhausting pressure. Foot valves or foot controlled valves of known types are convenient. Springs 32 rest at their lower ends on mounting lugs 35 which are secured to the inside face of housing wall 13 by the cap screws 36 shown in Fig. 1.

A rotatable ring 40 is mounted on the under side of annular piston 30 and carried thereby. The lower face of piston 30 has, at its inner edge, an annular machined surface 41 against which a machined shoulder surface 42 of ring 40 bears upwardly. An internal annular shoulder 43 is formed on the piston, and a ring 44 which is secured to ring 40 by cap screws 45, bears downwardly on shoulder 43. When cap screws 45 are set up solidly, the spacing between ring shoulder 42 and the lower face of ring 44 is such, with relation to the spacing between piston face 41 and shoulder 43, that ring 40 is locked to the piston and is thus held against rotation. By loosening screws 45, the ring is then readily rotatable on a vertical central axis with relation to the piston, without any excessive vertical looseness.

Rotatable ring 40 carries a central changeable bushing 50, preferably set into ring 40 by threading, and having an internal threading 51 adapted to take the collet threads 52 of standard collets. Bushing 50 is set tightly in ring 40 to rotate with the ring, and the ring and bushing together form what may be termed a collet nut which takes the lower threaded end of the standard collet and is rotatable with reference to the piston and to the other parts of the device, and with reference to the collet.

A readily removable stop bracket is provided for the purpose of carrying an adjustable stop to limit the insertion of the work into the collet. As here shown, this stop bracket comprises a flat bar 54 extending across the bottom interior of the main housing and secured to two of the mounting lugs 35 by screws 55. An adjustable stop, preferably in the form of a long vertical threaded screw or bolt 56 is screw-threadedly mounted in bracket 54, with its head uppermost. A screwhead of any suitable form may be used; a slotted head is here shown which may easily be reached with an ordinary screw driver through the jaw bore 57 of the collet. The stop may thus easily be set up and down within the collet to standardize the insertion of the work into the collet. The projecting lower end of the long adjustable stop screw may project through an opening in the table or face plate; or, for any particular set-up, the stop screw 56 may be cut to special length for the particular job, so that there is no projecting end.

In setting up the chuck for any particular job, the collet adapter 16 will be selected to suit the external dimensions of the particular collet or collets employed. Due to the fact that some of these adapters may be rather thin walled, the detent spring 23 may preferably have its rear end bearing against the bore 15, as illustrated, instead of bearing against a seat within the wall of the adapter. After inserting the selected adapter, the selected collet is then inserted into the adapter. The collet may then be screw-threadedly pulled down in the collet nut, either by loosening screws 45 and rotating the nut before the chuck is secured to the table or face plate, or by rotating the collet with sufficient force to make the spring-pressed ball 22 yield. The first mentioned procedure is the preferred and normal one, the collet being held against rotation by the spring-pressed ball while the collet nut is being rotated to draw the collet into the nut to its proper operating position—a relative position such as shown in Fig. 2. After the collet has been set in its operative position by nut rotation, screws 45 are then set up to hold the nut from rotation. However, if the chuck is already set and alined on the table or face plate, and it is desired to change collets without disturbing the setting of the chuck, a new collet may be inserted and threaded into position by rotating the collet. Although the collet nut may be relatively freely rotatable on the piston if screws 45 are not set up, the small amount of friction at the threads 51, 52, and the mass of the collet nut, enable the collet to be rotated and threaded into the relatively stationary nut. Normally, however, the nut will be locked against rotation, by screws 45, when a collet is threaded into position by rotating the collet.

Fig. 2 shows the chuck in its actuated or work-gripping position, with the head of the collet drawn down in conical bore 19 and compressed in a position to hold the work. Fluid pressure is at this time present in cylinder 12, pressing and holding the piston and the collet down. With the work thus gripped, any desired operation, or series of operations, may be carried out on the work. Immediately the operation or operations are completed, release of pressure from cylinder 12 allows the piston to be moved up by springs 32, moving the collet up with it high enough to allow the collet head to expand. A limit stop for the upward motion is preferably formed by ring 44 engaging the lower end of sleeve 14, rather than by ring 40 or bushing 50 engaging the lower end of adapter 16. Dirt and chips may lodge between 50 and 16, but the space between 44 and 14 is closed by the lower end of the adapter 16 projecting below the upper face of 44 and into its bore and that of ring 40 with a fairly close fit.

I claim:

1. In a fluid pressure actuated collet chuck, a body having an external cylindric wall, an upper head wall and an internal sleeve depending from the head wall, which walls form a downwardly opening annular cylinder, an annular piston in the cylinder adapted to be forced downwardly by fluid pressure in the cylinder, the sleeve containing a vertical collet receiving bore with a conical counterbore at its upper end adapted to engage with the conical head of a collet to contract the collet head on its downward movement in the bore, and an annular collet nut below the lower end of the sleeve bore, said nut mounted on the piston to move vertically therewith but to be rotatable with reference thereto, and having a central screw threaded bore to take the lower screw threaded end of a collet which is in the sleeve bore.

2. In a fluid pressure actuated collet chuck, a body having an external cylindric wall, an upper head wall and an internal sleeve depending from the head wall, which walls form a downwardly opening annular cylinder, an annular piston in the cylinder adapted to be forced downwardly by fluid pressure in the cylinder, the sleeve containing a vertical collet receiving bore with a conical counterbore at its upper end adapted to engage with the conical head of a collet to contract the collet head on its downward movement in the bore, an annular collet nut below the lower end of the sleeve, said nut being of an external diameter greater than the internal diameter of the piston and having an upper annular face which bears upwardly against a lower face of the piston, the piston having an upwardly facing annular shoulder, a bearing ring secured to the nut and bearing down on the piston shoulder, the nut being rotatable on the vertical axis of the sleeve bore with reference to the piston, and the nut having a central threaded bore adapted to take the lower threaded end of a collet which is in the sleeve bore.

3. In a fluid pressure actuated collet chuck, a body having an external cylindric wall, an upper head wall and an internal sleeve depending from the head wall, which walls form a downwardly opening annular cylinder, an annular piston in the cylinder adapted to be forced downwardly by fluid pressure in the cylinder, the sleeve containing a vertical collet receiving bore with a conical counterbore at its upper end adapted to engage with the conical head of a collet to contract the collet head on its downward movement in the bore, an annular element mounted on the piston to move vertically therewith below the lower end of the depending sleeve, said element provided with means to take and hold the lower end of a collet which is in the sleeve bore.

GEORGE W. COOK.